US012623907B2

(12) United States Patent
Parkinson et al.

(10) Patent No.: US 12,623,907 B2
(45) Date of Patent: May 12, 2026

(54) CARBON SEPARATION AND REMOVAL FROM MOLTEN MEDIA

(71) Applicant: MOLTEN INDUSTRIES INC., Oakland, CA (US)

(72) Inventors: Brett Parkinson, Goleta, CA (US); Andrew Caldwell, Goleta, CA (US); Samuel Shaner, Goleta, CA (US)

(73) Assignee: Molten Industries Inc., Oakland, CA (US)

( * ) Notice: Subject to any disclaimer, the term of this patent is extended or adjusted under 35 U.S.C. 154(b) by 571 days.

(21) Appl. No.: 18/041,666

(22) PCT Filed: Aug. 27, 2021

(86) PCT No.: PCT/US2021/047952
§ 371 (c)(1),
(2) Date: Feb. 14, 2023

(87) PCT Pub. No.: WO2022/047156
PCT Pub. Date: Mar. 3, 2022

(65) Prior Publication Data
US 2023/0322559 A1     Oct. 12, 2023

Related U.S. Application Data

(60) Provisional application No. 63/071,857, filed on Aug. 28, 2020.

(51) Int. Cl.
*C01B 32/05* (2017.01)
(52) U.S. Cl.
CPC .................................. *C01B 32/05* (2017.08)

(58) Field of Classification Search
CPC ....... C01B 32/00; C01B 32/05; C01B 32/205; C01B 3/24; C01B 3/26; B01D 8/00
See application file for complete search history.

(56) References Cited

U.S. PATENT DOCUMENTS

| | | | |
|---|---|---|---|
| 1,756,877 A | 4/1930 | Paris, Jr. | |
| 2,760,847 A | 8/1956 | Oblad | |
| 4,823,712 A | 4/1989 | Wormer | |

(Continued)

FOREIGN PATENT DOCUMENTS

| | | |
|---|---|---|
| WO | 2016079122 A1 | 5/2016 |
| WO | 2019099795 A1 | 5/2019 |

(Continued)

OTHER PUBLICATIONS

Kang, et al., "Catalytic methane pyrolysis in molten MnCl2-KCl" Applied Catalysis B: Environmental, vol. 254 (May 7, 2019); pp. 659-666.

(Continued)

*Primary Examiner* — Richard M Rump
(74) *Attorney, Agent, or Firm* — Asif Ghias

(57) ABSTRACT

A reaction system comprises a reactor vessel, a secondary vessel, a transfer line providing fluid communication between the reactor vessel and the secondary vessel, a return line providing fluid communication between the secondary vessel and the reactor vessel, a filter disposed within the secondary vessel, and at least one freeze plug valve disposed within the transfer line or the return line.

12 Claims, 5 Drawing Sheets

(56)                  References Cited

U.S. PATENT DOCUMENTS

| | | | |
|---|---|---|---|
| 5,603,825 | A | 2/1997 | Costinel |
| 11,897,768 | B2 | 2/2024 | Ashton |
| 2007/0121294 | A1 | 5/2007 | Campbell |
| 2008/0307703 | A1 | 12/2008 | Dietenberger |
| 2011/0056240 | A1 | 3/2011 | Malik |
| 2012/0227405 | A1 | 9/2012 | Bruce |
| 2013/0075348 | A1 | 3/2013 | Ylikangas |
| 2014/0335008 | A1 | 11/2014 | Kim |
| 2015/0059571 | A1 | 3/2015 | Denton |
| 2015/0306520 | A1 | 10/2015 | Grave |
| 2016/0189806 | A1 | 6/2016 | Cheatham, III |
| 2017/0217772 | A1 | 8/2017 | Stiller |
| 2017/0240421 | A1 | 8/2017 | Erlebacher |
| 2017/0276430 | A1 | 9/2017 | Cooper |
| 2019/0055173 | A1 | 2/2019 | Desai |
| 2019/0375633 | A1 | 12/2019 | O'Connor |
| 2020/0071162 | A1 | 3/2020 | Gupta |
| 2020/0071164 | A1 | 3/2020 | Gupta |
| 2021/0061654 | A1* | 3/2021 | McFarland ............. B01J 35/27 |
| 2023/0007896 | A1 | 1/2023 | Saadi |
| 2023/0099516 | A1 | 3/2023 | Shaner |
| 2025/0144548 | A1 | 5/2025 | Shaner et al. |

FOREIGN PATENT DOCUMENTS

| | | | |
|---|---|---|---|
| WO | 2019197253 | A1 | 10/2019 |
| WO | 2019226416 | A1 | 11/2019 |
| WO | 2020161192 | A1 | 8/2020 |
| WO | 2021113708 | A1 | 6/2021 |
| WO | 2021183959 | A1 | 9/2021 |
| WO | 2022047156 | A1 | 3/2022 |
| WO | 2023147377 | A2 | 8/2023 |

OTHER PUBLICATIONS

International Preliminary Report on Patentability dated Mar. 9, 2023, PCT/US2021/047952 filed on Aug. 27, 2021.

Office Action dated May 30, 2025, U.S. Appl. No. 17/782,846, filed Jun. 6, 2022.

Partial Search Report and Written Opinion dated Oct. 12, 2021, PCT/US2021/047952 filed on Aug. 27, 2021.

International Search Report and Written Opinion dated Jan. 5, 2022, PCT/US2021/047952 filed on Aug. 27, 2021.

International Search Report and Written Opinion dated Feb. 1, 2021, PCT/US2020/063406, filed on Dec. 4, 2020.

International Preliminary Report on Patentability dated Jun. 16, 2022, PCT/US2020/063406, filed on Dec. 4, 2020.

Rule 161/162 Communication dated Jul. 13, 2022, EP Application No. 20895721.7, filed on Apr. 25, 2022.

European Extended Search Report dated Oct. 31, 2024, EP Application No. 20895721.7, filed on Apr. 25, 2022.

Japanese Office Action dated Jan. 14, 2025, JP Application No. 2022-532591, filed May 30, 2022.

Restriction Requirement dated Mar. 21, 2025, U.S. Appl. No. 17/782,846, filed Jun. 6, 2022.

International Search Report and Written Opinion dated May 27, 2021, PCT/US2021/022220, filed on Mar. 21, 2021.

International Preliminary Report on Patentability dated Sep. 22, 2022, PCT/US2021/022220 filed on Mar. 21, 2021.

Rule 161/162 Communication dated Oct. 20, 2022, EP Application No. 21768755.7, filed on Aug. 31, 2022.

European Extended Search Report dated Mar. 4, 2025, EP Application No. 21768755.7, filed on Aug. 31, 2022.

Partial International Search Report dated Apr. 19, 2023, PCT/US2023/061295 filed Jan. 25, 2023.

International Search Report and Written Opinion dated Jul. 18, 2023, PCT/US2023/061295, filed Jan. 25, 2023.

International Preliminary Report on Patentability dated Aug. 8, 2024, PCT/US2023/061295, filed Jan. 25, 2023.

Kang, et al., "Catalytic methane pyrolysis in molten MnCl2-KCl" Applied Catalysis B: Environmental, vol. 254 (May 7, 2019); pp. 659-666.

Li, et al., "Entropy generation rate minimization for steam methane reforming reactor heated by molten salt" Energy Reports, vol. 6 (Mar. 18, 2020); pp. 685-697.

Rahimi, et al. "Solid carbon production and recovery from high temperature methane pyrolysis in bubble columns containing molten metals and molten salts" Carbon, vol. 151 (May 17, 2019): pp. 181-191; entire document.

Parkinson, Brett, et al., "Hydrogen production using methane: Techno-economics of decarbonizing fuels and chemicals," International Journal of Hydrogen Energy, vol. 43, No. 5, Feb. 1, 2018 (Feb. 1, 2018), pp. 2540-2555, XP055639731, Amsterdam, NL ISSN: 0360-3199, DOI: 10.1016/j.ijhydene.2017.12.081, p. 2544-p. 2545; figure 3.

Upham, D Chester, et al., "Catalytic molten metals for the direct conversion of methane to hydrogen and separable carbon," Science (New York, N.Y.), Nov. 17, 2017 (Nov. 17, 2017), pp. 917-921, XP055609409, United States, DOI: 10.1126/science.aao5023 Retrieved from the Internet: URL:https://science.sciencemag.org/content/sci/358/6365/917.full.pdf.

Saadi, Fadl, et al., entitled, "Molten Salt Reactor Improvements," U.S. Appl. No. 62/944,819, filed Dec. 6, 2019.

Shanner, Samuel, et al., entitled, "Methods of Pneumatic Carbon Removal," U.S. Appl. No. 62/989,016, filed Mar. 20, 2020.

Parkinson, Brett, et al., entitled, "Carbon Separation and Removal From Molten Media," U.S. Appl. No. 63/071,857, filed Aug. 28, 2020.

Shanner, Samuel, et al., entitled, "Continuous Separation of Multiphase Mixtures," U.S. Appl. No. 63/302,843, filed Jan. 25, 2022.

Shanner, Samuel, et al., entitled, "Continuous Separation of Multiphase Mixtures," U.S. Appl. No. 18/832,606, filed Jul. 24, 2024.

Office Action dated May 5, 2025, U.S. Appl. No. 17/906,108, filed Sep. 21, 2022.

* cited by examiner

CARBON SEPARATION AND REMOVAL FROM MOLTEN MEDIA

CROSS-REFERENCE TO RELATED APPLICATIONS

This application is a filing under 35 U.S.C. 371 as the National Stage of International Application No. PCT/US2021/047952, filed on Aug. 27, 2021, entitled, "CARBON SEPARATION AND REMOVAL FROM MOLTEN MEDIA," which claims the benefit of and claims priority to U.S. Provisional Application No. 63/071,857 filed on Aug. 28, 2020 and entitled, "CARBON SEPARATION AND REMOVAL FROM MOLTEN MEDIA," both of which are incorporated herein by reference in their entirety for all purposes.

STATEMENT REGARDING GOVERNMENTALLY SPONSORED RESEARCH OR DEVELOPMENT

This invention was made with government support under Grant DE-AR0001194 awarded by the Department of Energy. The government has certain rights in this invention.

BACKGROUND

The transformation of chemical feedstocks into products relies on reactors with controlled internal conditions. Conversion of hydrocarbon feedstocks such as natural gas containing methane with strong carbon-hydrogen bonds is particularly challenging and typically utilizes reactors containing catalysts and/or making use of high temperatures. A major limitation in chemical reaction engineering is the inability to perform very high temperature reactions efficiently at high pressure due to the limitations of reactor construction materials. For reversible reactions, equilibrium limitations, can also make very high temperatures desirable but limited by reactor material considerations. This is especially true in corrosive environments. Above approximately 1000° C. few moderate cost materials can be used for construction of safe pressure vessels and the associated reactor equipment.

SUMMARY

These and other features will be more clearly understood from the following detailed description taken in conjunction with the accompanying drawings and claims.

In some embodiments, a reaction system comprises a reactor vessel, a secondary vessel, a transfer line providing fluid communication between the reactor vessel and the secondary vessel, a return line providing fluid communication between the secondary vessel and the reactor vessel, a filter disposed within the secondary vessel, and at least one freeze plug valve disposed within the transfer line or the return line.

In some embodiments, a carbon removal system comprises a vessel, a filter disposed within the vessel, an agitator disposed within the vessel, and a liquid sump in a lower portion of the vessel. The agitator is configured to agitate a filter cake formed on the filter.

In some embodiments, a method of separating a product from a molten media comprises passing a hydrocarbon gas through a molten media in a reactor vessel to produce reaction products, passing the molten media with the solid carbon through a transfer line to a secondary vessel, separating the solid carbon from the molten media in the secondary vessel to form a filter cake, forming a first frozen plug in the transfer line, passing the molten media from the secondary vessel back to the reactor vessel through a return line, and forming a second frozen plug in the return line. The reaction products comprise hydrogen and solid carbon, and the solid carbon is retained in the molten media. The reactor vessel is sealed from the secondary vessel by the first frozen plug in the transfer line and the second frozen plug in the return line.

BRIEF DESCRIPTION OF THE DRAWINGS

For a more complete understanding of the present disclosure, reference is now made to the following brief description, taken in connection with the accompanying drawings and detailed description.

DETAILED DESCRIPTION

Figure 1:
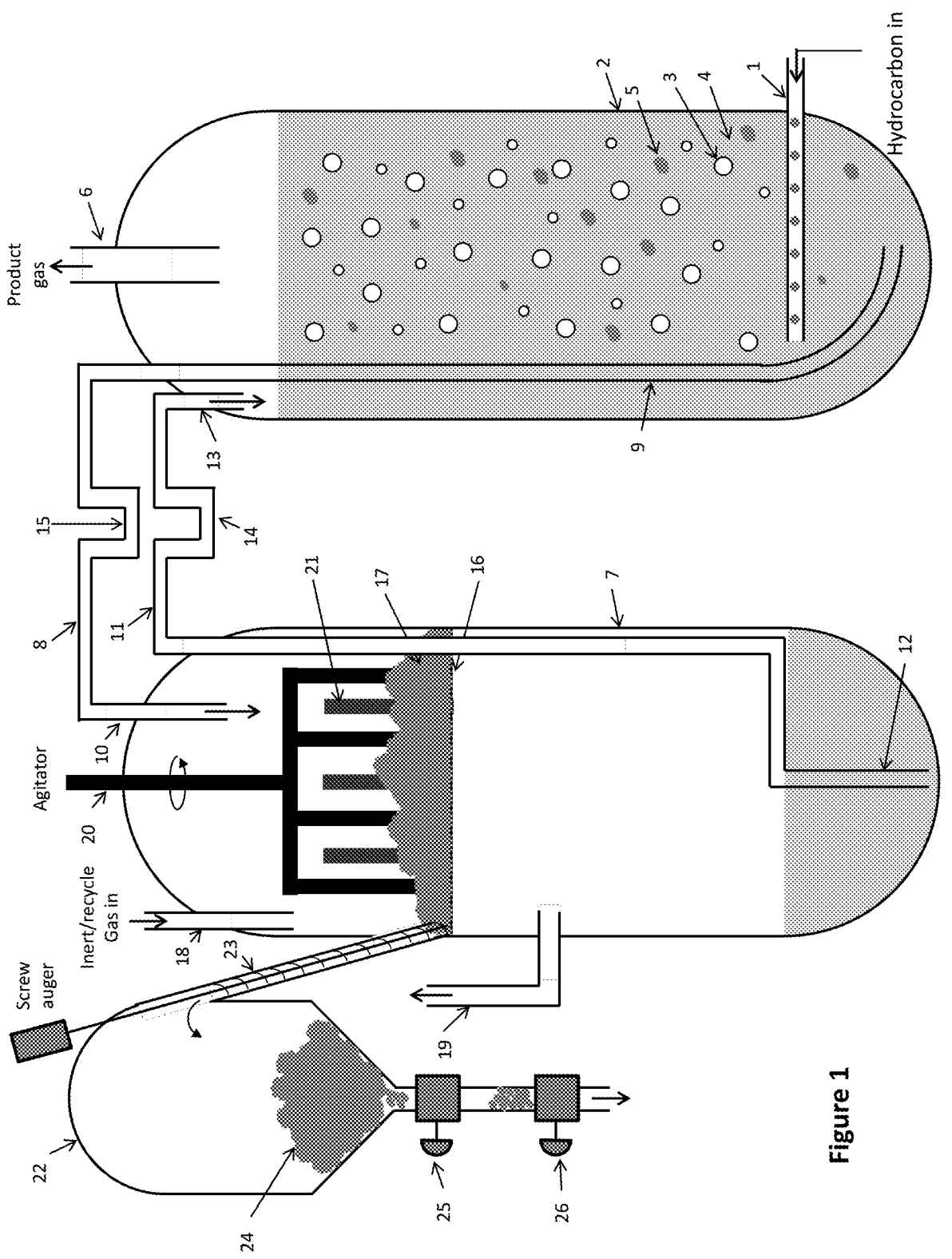
FIG. 1 schematically illustrates a reactor system according to an embodiment.

Disclosed herein are systems and methods for the separation and cleaning of carbon produced via hydrocarbon pyrolysis from molten media. The systems and methods described herein are based on transformation of natural gas or other molecules or mixtures of molecules containing predominately hydrogen and carbon atoms into a solid carbon product that can be readily handled and prevented from forming carbon oxides in the atmosphere, as well as a gas phase co-product. In some embodiments, the gas-phase co-product, hydrogen, can be used as a fuel or chemical. The overall process in this case can be referred to as pyrolysis, $C_nH_{2m} \rightarrow mH_2 + nC$.

A key challenge with hydrocarbon pyrolysis in molten media systems is the separation of the carbon from the molten media and the removal of residual media from the carbon. Due to the high temperatures involved, the systems described herein are configured to use freeze plug valves within the carbon/molten media transfer lines to isolate the vessels used to perform the carbon accumulation and carbon drying steps without the use of mechanical valves.

In this disclosure, the hydrocarbon pyrolysis reaction can be carried out in a reactor such as a bubble column reactor where hydrogen and unreacted hydrocarbons leave as a gas stream and carbon can be accumulated in the molten media. Periodically, a portion of the carbon/molten media mixture can be transferred to a secondary vessel where the carbon can be separated or filtered from the molten media. The molten media filtrate can then be transferred back to the reactor vessel. Following filtration of the carbon, the secondary vessel can be isolated from the reactor vessel and the carbon drying/media recovery processes can be commenced.

Carbon purification can comprise a number of steps. In some embodiments, a first step in carbon drying/cleaning can involve blowing hot gas over the filter cake to remove excess molten media as a liquid. After this step, the molten media content in the carbon can be between about 50-98 wt. %. In some embodiments, a second step in carbon drying/ cleaning can involve contacting the filter cake with hot, dry gas to evaporate molten media from the carbon. This can be done either at the reactor pressure or a reduced pressure. In some aspects, an agitator can be used to mix the filter cake to enhance drying/cleaning. A series of heating elements can be optionally dispersed in and around the filter cake to supply the necessary heat for molten media evaporation. The residual media content in the carbon can be reduced to 0-80 wt. %. In some embodiments, current can be directly applied to the conductive carbon bed to supply the necessary heat for molten media evaporation. For example, one or more electrodes can be used to supply electrical current to the carbon to create resistive heating in the carbon bed. The carbon filter cake can then be removed from the system to a tertiary carbon accumulation vessel, where the carbon can be cooled and load-locked out of the closed-system environment.

As disclosed herein, a series of media-freeze plug valves can be used to allow or block flow in the transfer lines between the reactor and secondary vessel. While described in terms of the molten media reactor configurations described herein, the use of the molten media-freeze plugs can be used in various portions of the molten media process to provide an effective valving arrangement in portions of the process that may experience temperatures above standard operating temperatures for common valves and valve materials. In some aspects, the differential pressure between the two vessels can be used to provide the motive force to transfer fluid. The freeze plug valves can also be used to isolate the reactor and secondary vessels from each other and allow their independent operation. The use of media-freeze plugs can allow the vessels to be isolated without the need for mechanical valves that may not work at the operating temperature of pyrolysis reactors such as between about 700° C. and about 1,400° C., where the valves may be, for example, in direct or indirect contact with the liquid media environment.

FIG. 1 is a schematic illustration of a coupled system for carrying out hydrocarbon pyrolysis, carbon separation, carbon drying/cleaning, and carbon removal from the system. As shown, hydrocarbon gas can be introduced through a distributor or manifold 1 located at or near the bottom of the reactor pressure vessel 2. The hydrocarbon gas can pass out of the distributor or manifold 1 to form gas bubbles 3 that can pass upwards through the molten media 4. The hydrocarbon gas bubbles 3 can be heated by the molten media 4 and react to form reaction products comprising hydrogen gas, solid carbon 5, and other hydrocarbon species. Some amount of unreacted hydrocarbons can also be present in the rising gas bubbles 3. Carbon particles 5 can accumulate in the molten media 4. The product gas stream can disengage from the molten media 4 and leave through a product outlet 6 in the top of the reactor vessel 2.

The hydrocarbon gas can comprise natural gas (e.g., primarily methane), pure methane, or other hydrocarbon containing compositions containing primarily hydrogen and carbon such as heavier hydrocarbon gases (e.g., ethane, propane, etc.), biomass, hydrocarbon liquids, and the like. In some instances the hydrocarbon gas can contain elements other than hydrogen and carbon (e.g., oxygen, nitrogen, sulfur, etc.), so long as the other elements are only present in minor amounts.

The molten media can comprise a molten salt, a molten metal, or any combination thereof. In some embodiments, the salts can be any salt having a suitable melting point to allow the molten salt or molten salt mixture to be formed within the reactor. In some embodiments, the salt mixture comprises one or more oxidized atoms $(M)^{+m}$ and corresponding reduced atoms $(X)^{-1}$, wherein M is at least one of K, Na, Mg, Ca, Mn, Zn, La, Al, or Li, and wherein X is at least one of F, Cl, Br, I, OH, $SO_3$, or $NO_3$. Exemplary salts can include, but are not limited to, NaCl, NaBr, KCl, KBr, LiCl, LiBr, $CaCl_2$, $MgCl_2$, $CaBr_2$, $AlCl_3$, $MgBr_2$ and combinations thereof. In some embodiments, the liquid can be or contain a molten metal such as nickel, bismuth, copper, platinum, indium, lead, gallium, iron, palladium, tin, cobalt, tellurium, ruthenium, antimony, gallium, sodium, oxides thereof, or any combination thereof. For example, combinations of metals having catalytic activity for hydrocarbon pyrolysis can include, but are not limited to: nickel-bismuth, copper-bismuth, platinum-bismuth, nickel-indium, copper-indium, copper-lead, nickel-gallium, copper-gallium, iron-gallium, palladium-gallium, platinum-tin, cobalt-tin, nickel-tellurium, copper-tellurium, combinations thereof, and/or alloys thereof.

The reactor pressure vessel 2 can operate at suitable conditions for pyrolysis to occur. In some embodiments, the temperature can be selected to maintain the molten media in the molten state such that the molten media is above the melting point of the composition while being below the boiling point. In some embodiments, the reactor can be operated at a temperature above about 400° C., above about 500° C., above about 600° C., or above about 700° C. In some embodiments, the reactor can be operated at a temperature below about 1,500° C., below about 1,400° C., below about 1,300° C., below about 1,200° C., below about 1,100° C., or below about 1,000° C. The reactor can operate at any suitable pressure. The reactor may operate at a pressure between about 1 atm and about 25 atm. Higher pressures are possible with an appropriate selection of the reactor configuration, operating conditions, and flow schemes, where the pressure can be selected to maintain a gas phase within the reactor.

The resulting reaction can produce the solid carbon 5 that can be retained in the molten media 4. As disclosed herein a secondary vessel 7 can be used to remove the solid carbon 5 from the molten media 4. In some aspects, a secondary vessel 7 can be used for carbon separation and drying/cleaning. A transfer line 8 can be used for transferring fluid from the reactor vessel 2 to the secondary vessel 7. The carbon/molten media mixture can enter the transfer line 8 via an intake 9 that can be a submerged section of pipe in the reactor vessel 2. The molten media 4 passing through the transfer line 8 can pass into the secondary vessel 7 via an inlet 10 in the top or an upper portion of the secondary vessel 7.

A media return line 11 can be in fluid communication with the secondary vessel 7 and the reactor pressure vessel 2. The media return line 11 can be used to transfer fluid (e.g., molten media 4) from the secondary vessel 7 to the reactor pressure vessel 2. The molten media 4 can enter the return transfer line 11 via a submerged section of pipe 12 in the secondary vessel 7. The media return line 11 can pass into the reactor vessel 2 via an inlet 13 in the top or an upper portion of the reactor pressure vessel 2. Pressure differentials between the reactor pressure vessel 2 and the secondary vessel 7 can be used to drive movement of the molten media 4 and entrained solid carbon 5 between the vessels.

The transfer line 8 and the media return line 11 can each contain freeze plug sections. When fluid is transferred from the reactor pressure vessel 2 to the secondary vessel 7, molten media 4 can be frozen in a freeze plug valve section 14 in the return line 11. Alternatively, when fluid is transferred from the secondary vessel 7 to the reactor pressure vessel 2, molten media 4 can be frozen in a freeze plug valve section 15 in the transfer line 8. The secondary vessel 7 and the reactor pressure vessel 2 can be isolated from each other by freezing the molten media in both the freeze plug valve section 14 of the return line 11 and the freeze plug valve section 15 of the transfer line 8.

The freeze plug valve sections can comprise portions of the transfer line 8 and/or media return line 11 arranged for temperature control to selectively solidify and melt the molten media. The solidification of the molten media can form a solid plug in the line that can serve to form a seal in the corresponding line. The ability to selectively choose the state of the molten media in the freeze plug valve sections can allow these sections to serve as valves without the need for any mechanical or moving parts in contact with the liquid media environment. The use of temperature control can also help to prevent leakage as any leaks of the molten media can be solidified during a leak to further seal the freeze plug valve sections. Flow can be restored through the freeze plug valve sections by heating the freeze plug valve sections above the melting point of the media such that flow of the molten media 4 in either direction can be restored based on a pressure differential between the secondary vessel 7 and the reactor pressure vessel 2.

In some embodiments, the freeze plug valve sections can comprise a portion of the transfer line 8 and/or media return line 11. The portion of the corresponding line can be a straight section of the line. In some aspects, various shapes and/or bends can be used to help to mechanically fix a solid plug of the molten media 4 in place to help to resist movement of the solid plug. For example, a bend, a corner, a u-shaped section or the like can be formed within the freeze plug valve section. Upon forming a solid plug, a plug of the media may resist movement based on the shape of the solid plug and the shape of the freeze plug valve section. In some aspect, an internal structure or feature can be used to help to mechanically fix the solid plug of molten media in place. The illustration in FIG. 1 shows a u-shaped section, but it is understood that this given for illustration purposes only and does not limit the shapes able to be used to mechanically fix a solid plug. For example, one or more features such as apertures, pores, protrusions, shoulders, or the like, for example formed on an inner surface of the line or as part of an insert, can be used in a section of the line that can be straight, bent, or curved to retain the solid plug of media in place.

In order to control the temperature of the freeze plug valve sections, these sections may be disposed within a heated environment (e.g., in a heat exchanger), be coupled to temperature control elements (e.g., heating elements, cooling jackets, etc.), and/or use any other suitable structures used to selectively raise and lower the temperature around the melting point of the molten media 4 within a portion of the transfer line 8 and/or media return line 11.

The carbon/molten media mixture that is transferred from the reactor pressure vessel 2 to the secondary vessel 7 can be filtered through a filter 16. The filter 16 can comprise a mesh, screen, porous material (e.g., a ceramic, etc.) or the like. The filter 16 can be arranged to collect the molten media 4 being transferred from the reactor pressure vessel 2 through the transfer line 8. The filter 16 can be configured to allow the molten media 4 to pass through while retaining the solid carbon particles 5.

Some amount of the molten media 4 may be retained in the solid carbon 5 on the filter 16. The majority of the molten media 4 can collect in the bottom of the secondary vessel 7, while a carbon-rich filter cake 17 can be retained on the filter 16. Following filtration, a gas inlet 18 can be configured to pass a gas in the top or an upper portion of the secondary vessel 7 (e.g., above the filter 16) and flow the gas through the filter cake 17 to remove excess molten media retained in the solid carbon 5. The gas can exit the secondary vessel 7 via an outlet 19 below the filter cake 17. The molten media 4 filtrate can be transferred back to the reactor vessel 2. A pressure differential between the secondary vessel 7 and the reactor pressure vessel 2 can be used to drive the flow of the molten media through the media return line 11. In some aspects, the pressure differential can be induced by throttling the outlet gas flow between the secondary vessel 7 and the reactor pressure vessel 2.

Following the transfer of the filtrate back to the reactor pressure vessel 2, molten media 4 in both freeze plug valves 14, 15 can be frozen to isolate the secondary and reactor vessels. Excess media can then be removed from the carbon filter cake 17 via evaporation at the vessel pressure or a reduced pressure. Heat can be used to help to vaporize any remaining media 4 from the solid carbon 5. In some aspects, dry gas can flow through the filter cake 17 to carry away vapor. For example, dry gas can be supplied through gas inlet 18, pass through the filter cake 17, and pass out of the secondary vessel 7 via gas outlet 19. A downstream condenser can be used to recover the vaporized media and return the media to the system.

In some embodiments, an agitator 20 can be used to mechanically agitate or mix the filter cake 17 and prevent agglomeration of the carbon particles 5. The agitator 20 and/or embedded heating elements 21 can provide the necessary heat to vaporize the residual molten media 4. The heating elements 21 (e.g., resistive heating elements, combustion heated elements, etc.) can be coupled to the agitator 20, coupled to the filter 17, and/or positioned within the secondary vessel 7 to provide radiant heat to the filter cake 17. In some aspects, current can be passed through the carbon in the filter cake 17 to heat the filter cake 17. The filter cake 17 can be heated and agitated for a sufficient period of time to remove a desired amount of the residual molten media 4 from the solid carbon 5.

Following drying of the carbon filter cake 17, the dried carbon 24 can be transported to a tertiary vessel 22 via a mechanical and/or pneumatic conveyance. In the embodiment shown in FIG. 1, a screw auger 23 can be used to transfer the dried carbon 24 out of the secondary vessel 7. Other conveyances such as pneumatic conveyance using a high flowrate gas can also be used to entrain and carry the dried carbon 24 into the tertiary vessel 22. The dried carbon 24 can accumulate in the bottom of the tertiary vessel 22 and then be load locked out of the closed system environment via a series of mechanical valves 25, 26.

Figure 2:
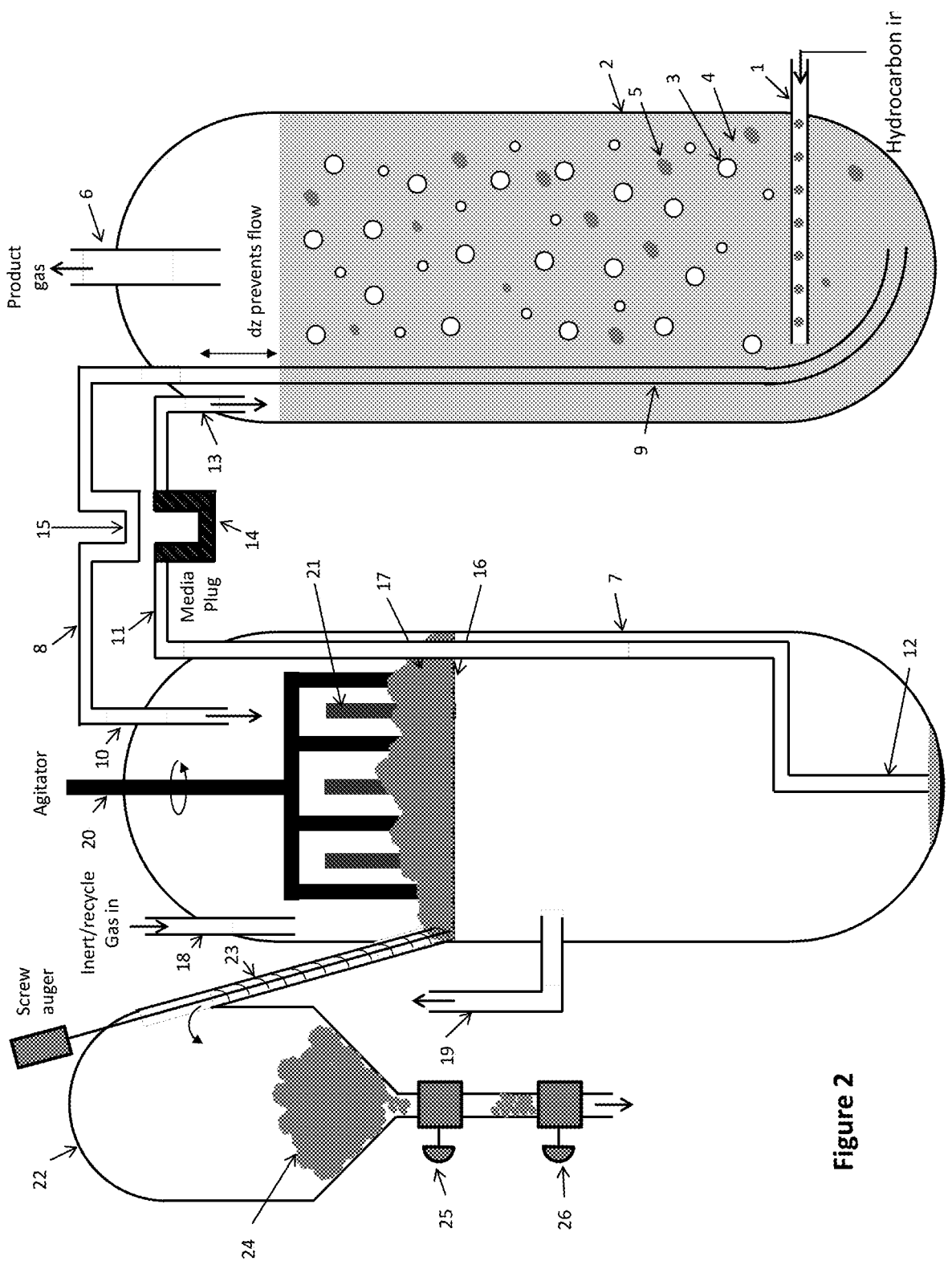
FIG. 2 schematically illustrates another reactor system according to an embodiment.

The system described with respect to FIG. 1 can be used to remove carbon from a molten media 4 in a molten media pyrolysis reactor 2. As shown in FIG. 2, an initial reaction step can be carried out with the hydrocarbon gas passing into the reactor pressure vessel 2 and through the molten media 4. During this step, the hydrocarbon gas can pass through the molten media 4 to form reaction products comprising hydrogen and solid carbon 5. The hydrogen can leave the system as a gaseous product through a product outlet 6, and the solid carbon 5 can accumulate in the molten media 4.

Within the reaction step, a freeze plug valve 14 in the media return line 11 can be formed by freezing a portion of the molten media 4 in the pipe. This can serve to form a seal in the media return line 11 between the reaction pressure vessel 2 and the secondary vessel 7. The transfer line 8 may or may not have a frozen plug 15 in the pipe. Without a pressure differential between the reaction pressure vessel 2 and the secondary vessel 7, the molten media 4 will not transfer through the transfer line 8. When a pressure differential exists, a frozen plug can also be formed in the transfer line 8 to entirely isolate the reactor vessel 2 from the secondary vessel 7.

Figure 3:
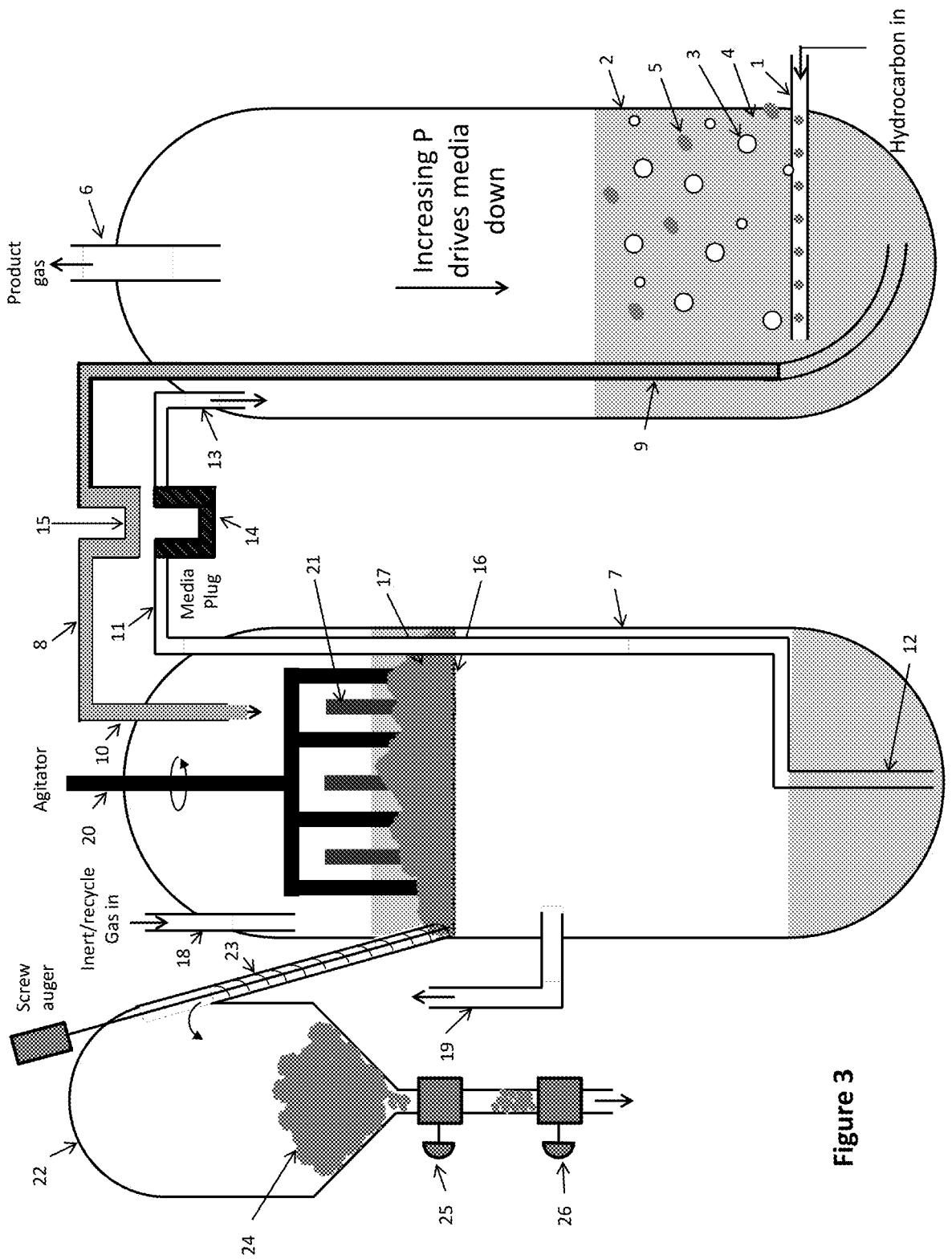
FIG. 3 schematically illustrates still another reactor system according to an embodiment.

FIG. 3 schematically illustrates the transfer of the molten media 4 containing the solid carbon 5 to the secondary vessel 7 for filtration and cleaning of the solid carbon 5. As shown in FIG. 3, the transfer line 8 may be clear of the media freeze plug valve section 15, and the pressure within the reaction pressure vessel 2 may be increased or the pressure in the secondary vessel 7 decreased. In response to the pressure increase or decrease, the molten media 4 and solid carbon 5 mixture may pass through the transfer line 8 to the secondary vessel. Within the secondary vessel 7, the molten media 4 and solid carbon 5 mixture may pass through a filter 16 where the solid carbon 5 can be retained on the filter 16 to form the carbon-rich filter cake 17, and the molten media 4 can pass through the filter 16 to the lower portion of the secondary vessel 2. The solid carbon 5 retained on the filter 16 can be drained of the molten media 4. In this step, the media return line 11 can have a frozen media plug 14 in the freeze plug valve section to prevent the molten media 4 from passing back to the reaction pressure vessel 2.

Figure 4:
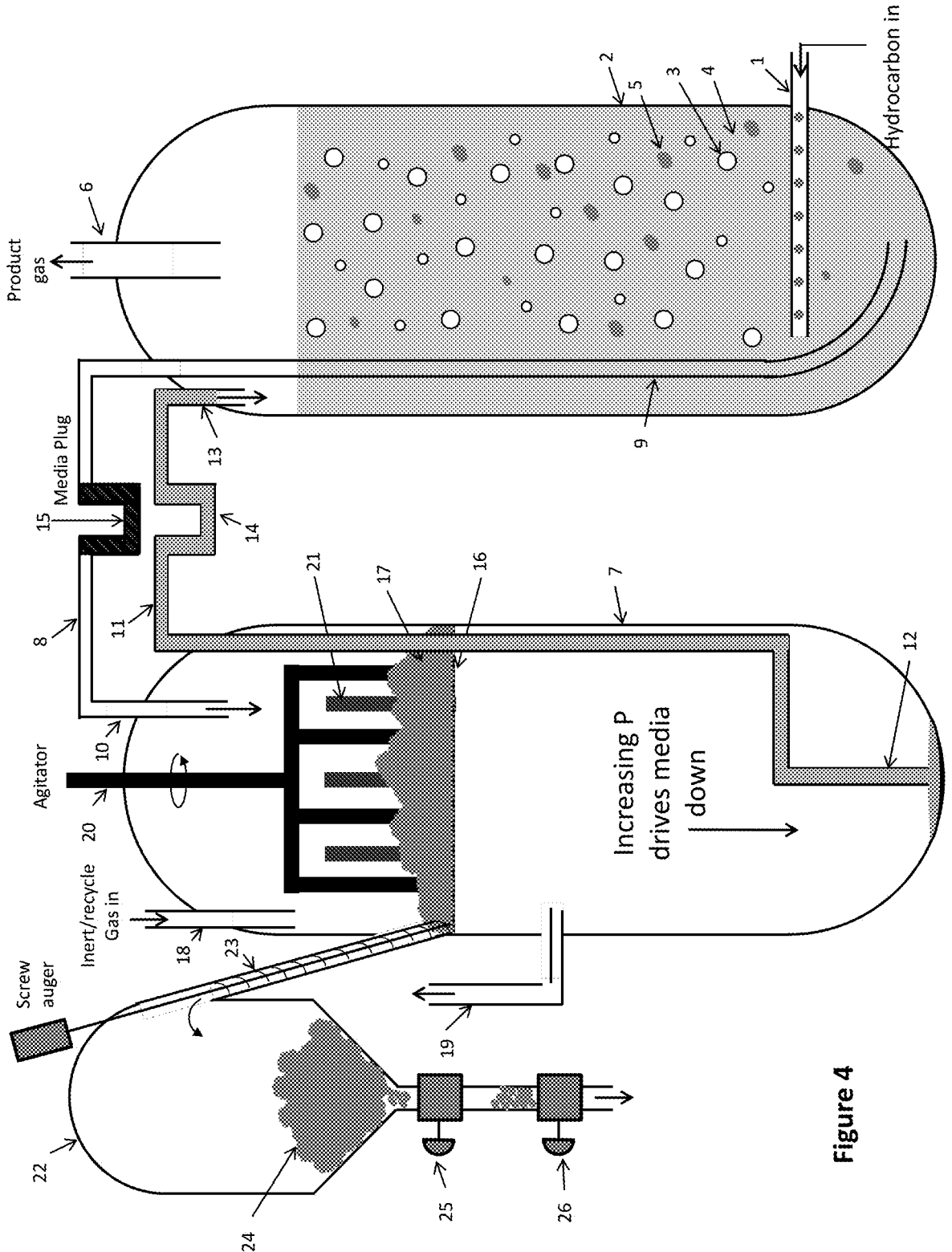
FIG. 4 schematically illustrates yet another reactor system according to an embodiment.

Once the molten media 4 has drained from the carbon-rich filter cake 17, a frozen media plug 15 can be formed in the transfer line 8, as shown in FIG. 4. Once the molten media plug 15 has frozen, heat can be applied to the frozen media plug 14 in the media return line 11 to melt the frozen media plug 14. Once melted, the pressure within the secondary vessel 7 can be increased, and due to a pressure differential between the secondary vessel 7 and the reactor pressure vessel 2, the molten media 4 in the lower portion of the secondary vessel 7 can pass through the media return line 11 to the reactor pressure vessel 2. The carbon filter cake 17 can be retained in the secondary vessel 7 for processing as described with respect to FIG. 1.

Figure 5:
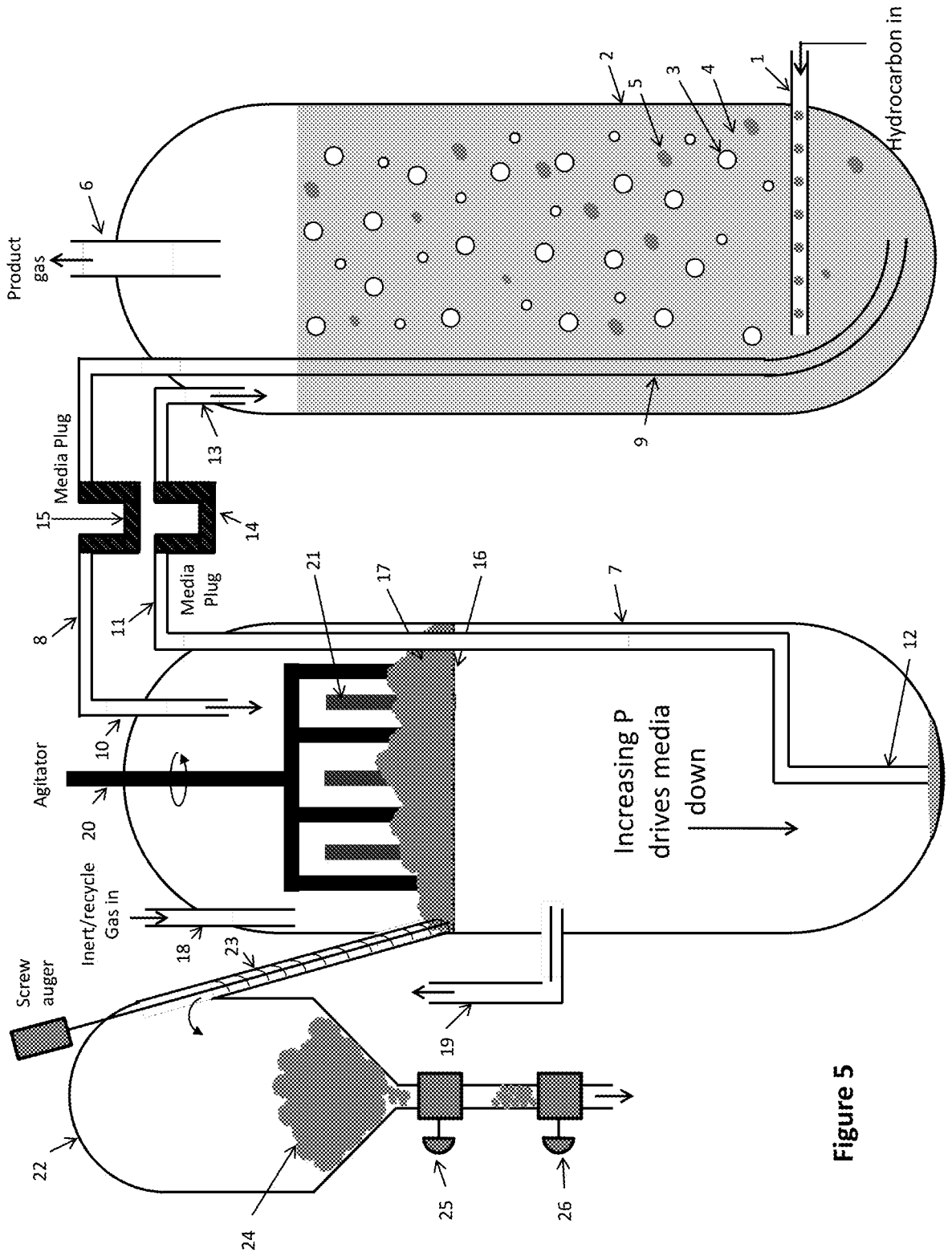
FIG. 5 schematically illustrates another reactor system according to an embodiment.

As shown in FIG. 5, frozen plugs can be formed in both the media return line 11 and transfer line 8, thereby sealing the reactor pressure vessel 2 from the secondary vessel 7 entirely once the molten media 4 has been returned from the secondary vessel 7 to the reactor pressure vessel 2. At that time, the separated solid carbon 5 can be processed and recovered from the secondary vessel 7. The reaction process can continue to be operated until the solid carbon 5 accumulates in the molten media 4 and the process is repeated to remove the solid carbon 5 from the molten media 4.

Within the systems and methods described herein, a single reactor vessel and a single secondary vessel are described. In some embodiments, a plurality of reactor vessels and/or secondary vessels may be present along with a corresponding plurality of transfer and return lines. For example, two or more reactor vessels may be fluidly coupled to an individual secondary vessel. The reactor vessels can be processed individually to separate the solid carbon from the molten media using the secondary vessel in a rotating fashion. This may allow one or more reactor vessels to operate at any given time, thereby creating a simulated continuous process for the reaction of hydrocarbon reactants with the generation of solid carbon and hydrogen.

Embodiments are discussed below with reference to the Figures. However, those skilled in the art will readily appreciate that the detailed description given herein with respect to these figures is for explanatory purposes as the systems and methods extend beyond these limited embodiments. For example, it should be appreciated that those skilled in the art will, in light of the teachings of the present description, recognize a multiplicity of alternate and suitable approaches, depending upon the needs of the particular application, to implement the functionality of any given detail described herein, beyond the particular implementation choices in the following embodiments described and shown. That is, there are numerous modifications and variations that are too numerous to be listed but that all fit within the scope of the present description. Also, singular words should be read as plural and vice versa and masculine as feminine and vice versa, where appropriate, and alternative embodiments do not necessarily imply that the two are mutually exclusive.

For example, another embodiment of the systems and methods described herein could be used for the pre-preparation and online transfer of molten media from another pre-treatment vessel, or additional makeup vessel, to the pyrolysis reactor during each cycle. In yet another embodiment of the systems and methods described herein, the molten media could be transferred to a holding vessel to facilitate maintenance and/or repair of the pyrolysis reactor or secondary carbon post-processing vessel.

Having described various systems and methods herein, various aspects can include, bur are not limited to:

In a first aspect, a reaction system comprises a reactor vessel; a secondary vessel; a transfer line providing fluid communication between the reactor vessel and the secondary vessel; a return line providing fluid communication between the secondary vessel and the reactor vessel; a filter disposed within the secondary vessel; and at least one freeze plug valve disposed within the transfer line or the return line.

A second aspect can include the system of the first aspect, wherein a first freeze plug valve is disposed in the transfer line and a second freeze plug valve is disposed in the return line.

A third aspect can include the system of the first or second aspect, wherein the at least one freeze plug valve comprises a straight section of the transfer line or the return line.

A fourth aspect can include the system of the first or second aspect, wherein the at least one freeze plug valve comprises a bent or curved section of the transfer line or the return line.

A fifth aspect can include the system of any one of the first to fourth aspects, wherein the at least one freeze plug valve comprises an internal feature configured to mechanically retain a plug of solid media in the at least one freeze plug valve.

A sixth aspect can include the system of any one of the first to fifth aspects, wherein the at least one freeze plug valve comprises a portion of the transfer line or the return line configured to be heated and cooled in order to selectively melt and freeze a reaction media.

A seventh aspect can include the system of any one of the first to sixth aspects, further comprising: a molten media disposed within at least one of the reactor vessel or the secondary vessel.

An eighth aspect can include the system of any one of the first to seventh aspects, further comprising: an agitator disposed within the secondary vessel, wherein the agitator is configured to agitate a filter cake formed on the filter.

A ninth aspect can include the system of any one of the first to eighth aspects, further comprising: one or more heating elements disposed within the secondary vessel, wherein the one or more heating elements are configured to heat a filter cake formed on the filter.

A tenth aspect can include the system of any one of the first to eighth aspects, wherein the molten media comprises one or more oxidized atoms $(M)+m$ and corresponding reduced atoms (X)−1, wherein M is at least one of K, Na, Mg, Ca, Mn, Zn, La, Al, or Li, and wherein X is at least one of F, Cl, Br, I, OH, $SO_3$, or $NO_3$. Exemplary salts can include, but are not limited to, NaCl, NaBr, KCl, KBr, LiCl, LiBr, $CaCl_2$, $MgCl_2$, $CaBr_2$, $AlCl_3$, $MgBr_2$ and combinations thereof.

An eleventh aspect can include the system of any one of the first to eighth aspects, wherein the molten media comprises a molten metal such as nickel, bismuth, copper, platinum, indium, lead, gallium, iron, palladium, tin, cobalt, tellurium, ruthenium, antimony, gallium, sodium, oxides thereof, or any combination thereof.

In a twelfth aspect, a carbon removal system comprises a vessel; a filter disposed within the vessel; an agitator disposed within the vessel, wherein the agitator is configured to agitate a filter cake formed on the filter; and a liquid sump in a lower portion of the vessel.

A thirteenth aspect can include the system of the twelfth aspect, further comprising: one or more heating elements disposed within the secondary vessel, wherein the one or more heating elements are configured to heat a filter cake formed on the filter.

A fourteenth aspect can include the system of the twelfth or thirteenth aspect, further comprising: a molten media disposed within the vessel, wherein the filter is configured to remove a solid carbon within the molten media, and wherein the liquid sump is configured to retain the molten media passing through the filter.

A fifteenth aspect can include the system of any one of the twelfth to fourteenth aspects, wherein the molten media comprises one or more oxidized atoms (M)+m and corresponding reduced atoms (X)−1, wherein M is at least one of K, Na, Mg, Ca, Mn, Zn, La, Al, or Li, and wherein X is at least one of F, Cl, Br, I, OH, $SO_3$, or $NO_3$. Exemplary salts can include, but are not limited to, NaCl, NaBr, KCl, KBr, LiCl, LiBr, $CaCl_2$, $MgCl_2$, $CaBr_2$, $AlCl_3$, $MgBr_2$ and combinations thereof.

A sixteenth aspect can include the system of any one of the twelfth to fourteenth aspects, wherein the molten media comprises a molten metal such as nickel, bismuth, copper, platinum, indium, lead, gallium, iron, palladium, tin, cobalt, tellurium, ruthenium, antimony, gallium, sodium, oxides thereof, or any combination thereof.

A seventeenth aspect can include the system of any one of the twelfth to fifteenth aspects, wherein the molten media comprises a molten salt.

In an eighteenth aspect, a method of separating a product from a molten media comprises: passing a hydrocarbon gas through a molten media in a reactor vessel to produce reaction products, wherein the reaction products comprise hydrogen and solid carbon, wherein the solid carbon is retained in the molten media; passing the molten media with the solid carbon through a transfer line to a secondary vessel; separating the solid carbon from the molten media in the secondary vessel to form a filter cake; forming a first frozen plug in the transfer line; passing the molten media from the secondary vessel back to the reactor vessel through a return line; and forming a second frozen plug in the return line, wherein the reactor vessel is sealed from the secondary vessel by the first frozen plug in the transfer line and the second frozen plug in the return line.

A nineteenth aspect can include the method of the eighteenth aspect, wherein separating the solid carbon from the molten media comprises filtering the solid carbon from the molten media in the secondary vessel.

A twentieth aspect can include the method of the eighteenth or nineteenth aspect, further comprising: drying/cleaning the solid carbon after separating the solid carbon from the molten media.

A twenty first aspect can include the method of the eighteenth or nineteenth aspect, wherein the solid carbon has a molten media content of between 50-98 wt. % after separating the solid carbon from the molten media.

A twenty second aspect can include the method of any one of the eighteenth to twenty first aspects, wherein the solid carbon has a molten media content of between 0-80 wt. % after drying/cleaning the solid carbon.

A twenty third aspect can include the method of any one of the eighteenth to twenty second aspects, wherein the molten media comprises a molten salt, and wherein the first frozen plug and the second frozen plug comprise solid salt plugs.

A twenty fourth aspect can include the method of any one of the eighteenth to twenty third aspects, wherein the molten media comprises one or more oxidized atoms (M)+m and corresponding reduced atoms (X)−1, wherein M is at least one of K, Na, Mg, Ca, Mn, Zn, La, Al, or Li, and wherein X is at least one of F, Cl, Br, I, OH, $SO_3$, or $NO_3$. Exemplary salts can include, but are not limited to, NaCl, NaBr, KCl, KBr, LiCl, LiBr, $CaCl_2$, $MgCl_2$, $CaBr_2$, $AlCl_3$, $MgBr_2$ and combinations thereof.

A twenty fifth aspect can include the method of any one of the eighteenth to twenty fourth aspects, wherein the molten media comprises a molten metal such as nickel, bismuth, copper, platinum, indium, lead, gallium, iron, palladium, tin, cobalt, tellurium, ruthenium, antimony, gallium, sodium, oxides thereof, or any combination thereof.

A twenty sixth aspect can include the method of any one of the eighteenth to twenty fifth aspects, wherein the reactor vessel operates at a temperature in the range of between about 700° C. and about 1,400° C.

A twenty seventh aspect can include the method of any one of the eighteenth to twenty sixth aspects, wherein at least one of the first frozen plug or the second frozen plug is disposed in a straight section of the transfer line or the return line, respectively.

A twenty eighth aspect can include the method of any one of the eighteenth to twenty sixth aspects, wherein at least one of the first frozen plug or the second frozen plug is disposed in a bent or curved section of the transfer line or the return line, respectively.

A twenty ninth aspect can include the method of any one of the eighteenth to twenty eighth aspects, wherein forming the first frozen plug in the transfer line comprises: passing the molten media through the transfer line; cooling the molten media in the transfer line; and freezing the molten media in the transfer line to form the first frozen plug.

A thirtieth aspect can include the method of any one of the eighteenth to twenty ninth aspects, further comprising: stirring the filter cake in the secondary vessel to remove the molten media from the filter cake.

A thirty first aspect can include the method of the thirtieth aspect, further comprising: heating the filter cake during the stirring to remove the molten media from the filter cake.

It is to be further understood that the present description is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present systems and methods. It must be noted that as used herein and in the appended claims (in this application, or any derived applications thereof), the singular forms "a," "an," and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this description belongs. Preferred methods, techniques, devices, and materials are described, although any methods, techniques, devices, or materials similar or equivalent to those described herein may be used in the practice or testing of the present systems and methods. Structures described herein are to be understood also to refer to functional equivalents of such structures. The present systems and methods will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims may be formulated in this Application or of any further Application derived therefrom, to particular combinations of features, it should be understood that the scope of the disclosure also includes any novel feature or any novel combination of features disclosed herein either explicitly or implicitly or any generalization thereof, whether or not it relates to the same systems or methods as presently claimed in any Claim and whether or not it mitigates any or all of the same technical problems as do the present systems and methods.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new claims may be formulated to such features and/or combinations of such features during the prosecution of the present Application or of any further Application derived therefrom.

The invention claimed is:

1. A method of separating a product from a molten media, the method comprising:
passing a hydrocarbon gas through a molten media in a reactor vessel to produce reaction products, wherein the reaction products comprise hydrogen and solid carbon, wherein the solid carbon is retained in the molten media;
passing the molten media with the solid carbon through a transfer line to a secondary vessel;
separating the solid carbon from the molten media in the secondary vessel to form a filter cake;
forming a first frozen plug in the transfer line;
passing the molten media from the secondary vessel back to the reactor vessel through a return line; and
forming a second frozen plug in the return line, wherein the reactor vessel is sealed from the secondary vessel by the first frozen plug in the transfer line and the second frozen plug in the return line.

2. The method of claim 1, wherein separating the solid carbon from the molten media comprises filtering the solid carbon from the molten media in the secondary vessel.

3. The method of claim 1, further comprising:
drying/cleaning the solid carbon after separating the solid carbon from the molten media.

4. The method of claim 1, wherein the solid carbon has a molten media content of between 50-98 wt. % after separating the solid carbon from the molten media, and wherein the solid carbon has a molten media content of between 0-80 wt. % after drying/cleaning the solid carbon.

5. The method of claim 1, wherein the molten media comprises one or more oxidized atoms $(M)^{+m}$ and corresponding reduced atoms $(X)^{-1}$, wherein M is at least one of K, Na, Mg, Ca, Mn, Zn, La, Al, or Li, and wherein X is at least one of F, Cl, Br, I, OH, $SO_3$, or $NO_3$.

6. The method of claim 1, wherein the molten media comprises nickel, bismuth, copper, platinum, indium, lead, gallium, iron, palladium, tin, cobalt, tellurium, ruthenium, antimony, gallium, sodium, oxides thereof, or any combination thereof.

7. The method of claim 1, wherein the reactor vessel operates at a temperature in the range of between about 700° C. and about 1,400° C.

8. The method of claim 1, wherein at least one of the first frozen plug or the second frozen plug is disposed in a straight section of the transfer line or the return line, respectively.

9. The method of claim 1, wherein at least one of the first frozen plug or the second frozen plug is disposed in a bent or curved section of the transfer line or the return line, respectively.

10. The method of claim 1, wherein forming the first frozen plug in the transfer line comprises:
passing the molten media through the transfer line;
cooling the molten media in the transfer line; and
freezing the molten media in the transfer line to form the first frozen plug.

11. The method of claim 1, further comprising:
stirring the filter cake in the secondary vessel to remove the molten media from the filter cake.

12. The method of claim 11, further comprising:
heating the filter cake during the stirring to remove the molten media from the filter cake.

* * * * *